United States Patent Office 3,787,445
Patented Jan. 22, 1974

3,787,445
THIENOBENZAZEPINES
Lucien Nedelec, Le Raincy, Jacques Guillaume, Aulnay-sous-Bois, and Andre Allais, Les Lilas, France, assignors to Roussel-UCLAF, Paris, France
No Drawing. Filed Feb. 28, 1972, Ser. No. 230,124
Claims priority, application France, Mar. 1, 1971, 7106917
Int. Cl. A61k 27/00; C07d 63/18
U.S. Cl. 260—332.3 P          11 Claims

ABSTRACT OF THE DISCLOSURE

Novel 4-(alkyaminoalkyl)-[4H]-thieno-[3,2-b][f]benzazepines of the formula

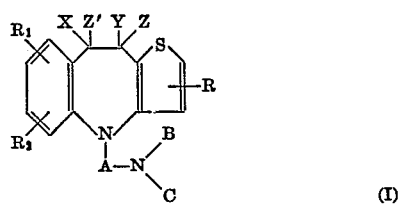

wherein $R_1$ and $R_2$ are selected from the group consisting of hydrogen, halogen, —$CF_3$, lower alkoxy optionally substituted, lower alkylthio, lower alkyl, optionally substituted sulfonamide, diloweralkylamino and acylamino wherein the acyl is derived from an organic carboxylic acid of 1 to 18 carbon atoms, R is selected from the group consisting of hydrogen and lower alkyl, A is alkylene of 2 to 5 carbon atoms, optionally substituted by lower alkyl, B is selected from the group consisting of hydrogen, lower alkyl and arloweralkyl, C is selected from the group consisting of lower alkyl and arloweralkyl and B and C taken together are alkylene of 2 to 6 carbon atoms optionally interrupted with 1 or 2 heteroatoms, Y is selected from the group consisting of hydrogen, hydroxy, lower alkoxy and lower alkanoyloxy, X is hydrogen and taken together with Y forms a carbon-carbon double bond, Z' is selected from the group consisting of hydrogen and lower alkyl and Z is selected from the group consisting of hydrogen, lower alkyl and lower alkoxy and taken with Y forms a member of the group consisting of =O, lower alkylenedioxy, lower alkylenedithio and thioloweralkyleneoxy and their non-toxic, pharmaceutically acceptable acid addition salts having antidepressant activity with a large therapeutic index and their preparation and novel intermediates.

OBJECTS OF THE INVENTION

It is an object of the invention to provide the novel thienobenzazepines of Formula I.

It is a further object of the invention to provide novel process for the preparation of the thienobenzazepines of Formula I.

It is another object of the invention to provide novel antidepressant compositions.

It is an additional object of the invention to provide a novel method of alleviating depression in warm-blooded animals.

These and other objects and advantages of the invention will become obvious from the following detail description.

THE INVENTION

The novel thienobenzazepines of the invention are selected from the group consisting of compounds of the formula

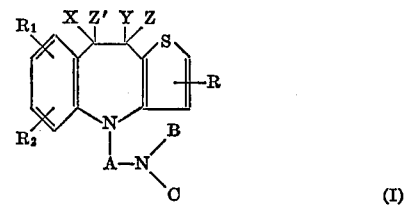

wherein $R_1$ and $R_2$ are selected from the group consisting of hydrogen, halogen, —$CF_3$, lower alkoxy optionally substituted, lower alkylthio, lower alkyl, optionally substituted sulfonamido, diloweralkylamino and acylamino wherein the acyl is derived from an organic carboxylic acid of 1 to 18 carbon atoms, R is selected from the group consisting of hydrogen and lower alkyl, A is alkylene of 2 to 5 carbon atoms optionally substituted by lower alkyl, B is selected from the group consisting of hydrogen, lower alkyl and arloweralkyl, C is selected from the group consisting of lower alkyl and arloweralkyl and B and C taken together are alkylene of 2 to 6 carbon atoms optionally interrupted with 1 or 2 heteroatoms, Y is selected from the group consisting of hydrogen, hydroxy, lower alkoxy and lower alkanoyloxy, X is hydrogen and taken together with Y forms a carbon-carbon double bond, Z' is selected from the group consisting of hydrogen and lower alkyl and Z is selected from the group consisting of hydrogen, lower alkyl and lower alkoxy and taken with Y forms a member of the group consisting of =O, lower alkylenedioxy, lower alkylenedithio and thioloweralkyleneoxy and their non-toxic, pharmaceutically acceptable acid addition salts.

Examples of suitable acids for the formation of the acid addition salts are mineral acids such as hydrochloric acid, sulfuric acid and phosphoric acid and organic acids such as maleic acid, fumaric acid, acetic acid, tartaric acid, etc.

Examples of the specific compounds of Formula I are 4 - (γ-dimethylaminopropyl) - [4H] - thieno - [3,2-b]-[f]-benzazepine and its acid fumarate, 4-(δ-methylaminopropyl) - 9,10 - dihydro-[4H]-thieno - [3,2-b][f]-benzazepine and its hydrochloride, 4 - (δ - dimethylaminopropyl) - 9,10 - dihydro-[4H]-thieno-[3,2-b][f]-benzazepine and its hydrochloride, 4-(δ-dimethylaminopropyl)-10-hydroxy - 9,10 - dihydro-[4H]-thieno-[3,2-b][f]-benzazepine and its acid fumarate, 10-oxo-4-(δ-dimethylaminopropyl) - 9,10 - dihydro-[4H]-thieno-[3,2-b][f]-benzazepine and its acid fumarate and 4-(δ-dimethylamino-β-methyl-propyl) - 9,10 - dihydro - [4H] - thieno-[3,2-b][f]-benzazepine and its hydrochloride.

The novel process of the invention for the preparation of compounds of the formula

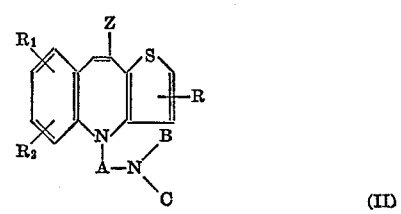

wherein R, $R_1$, $R_2$, A, B and C have the above definitions and Z is hydrogen comprises reacting a 10-hydroxy-9,10-dihydro-[4H]-thienobenzazepine of the formula

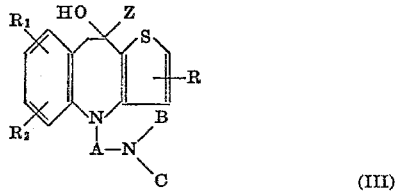

(III)

with an acid agent to obtain the corresponding [4H]-thieno[3,2-b][f]-benzazepine of Formula II which may be salified by addition of a mineral of organic acid or dealkylated by reaction with lower alkyl haloformate followed by alkaline hydrolysis. The acid agent may be a mineral acid such as sulfuric acid, perchloric acid or hydrochloric acid or on organic acid such as methanesulfonic acid, benzenesulfonic acid or p-toluenesulfonic acid.

The 10-hydroxy-9,10-dihydro-[4H]-thienobenzazepine of Formula III may be prepared according to the invention by reacting a 10-oxo-thienobenzazepine of the formula

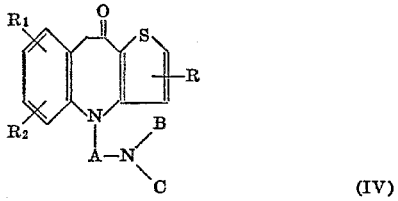

(IV)

wherein R, $R_1$, $R_2$, A, B and C have the above definitions with a reducing agent to form the corresponding 10-hydroxy-9,10-dihydro-[4H]-thienobenzazepine of Formula III which may be salified with a mineral or organic acid or esterified by reaction with an acylating derivative of a lower alkanoic acid. The reducing agent is preferably a mixed hydride of an alkali metal such as sodium borohydride, sodium trimethoxyborohydride or lithium aluminumhydride or a metal in a basic media such as zinc or aluminum in the presence of sodium carbonate or aluminum isopropylate in the presence of an alcohol.

The 10-oxo-9,10-dihydro-thienobenzazepines of Formula IV may be prepared by the invention by reacting a 9,10-dihydro-10-Y,Z-thienobenzazepine of the formula

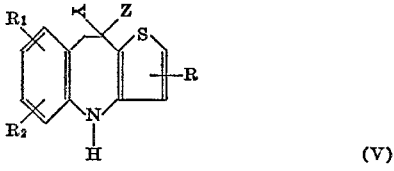

(V)

wherein R, $R_1$ and $R_2$ have the above definitions and Y and Z are selected from the group consisting of lower alkoxy and lower alkylthio or taken together are selected from the group consisting of lower alkylenedioxy, lower alkylenedithio and thioloweralkyleneoxy with an alkylaminoalkyl halide of the formula

(VI)

wherein A, B and C have the above definitions and Hal is selected from the group consisting of chlorine, bromine and iodine in the presence of a basic agent to form the compound of the formula

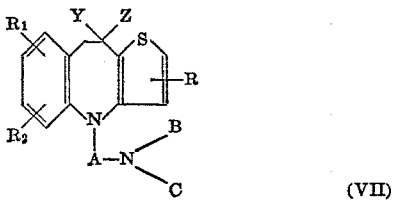

(VII)

and reacting the latter with an acid hydrolysis agent to form the corresponding compound of Formula IV which may be salified with a mineral or organic acid or dealkylated with alkyl haloformate followed by alkaline hydrolysis.

Preferably, the basic agent is an alkali metal hydride, amide or alcoholate or a metallation agent such as dimethyl sodium or diphenyl sodium and the acid hydrolysis agent is an aqueous mineral or organic acid, a ketonic acid or aldehydic acid. Particularly preferred as mineral acids are hydrochloric acid, sulfuric acid or perchloric acid and as organic acids are formic acid, acetic acid, tartaric acid, oxalic acid or citric acid. The ketonic acid may be pyruvic acid or levulinic acid and the aldehydic acid may be glyoxylic acid or malonaldehydric acid.

The novel process of the invention for the preparation of thienobenzazepines of the formula

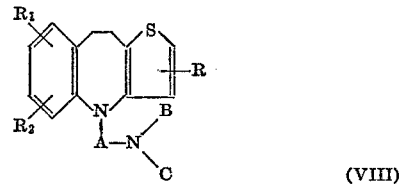

(VIII)

wherein R, $R_1$, $R_2$, A, B and C have the above definitions comprises reacting a 9,10-dihydro-10-Y,Z-thienobenzazepine of the Formula V wherein Y and Z are lower alkoxy or lower alkylthio and taken together form a member of the group consisting of lower alkylenedioxy, loweralkyleneditho and thioloweralkyleneoxy with an acid hydrolysis agent to form a 10-keto compound of the formula

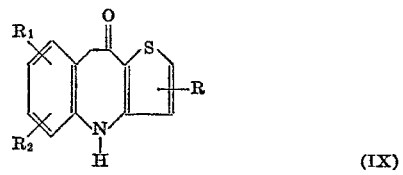

(IX)

and reacting the latter with a strong reducing agent to form the corresponding 9,10-dihydro-thienobenzazepine of the formula

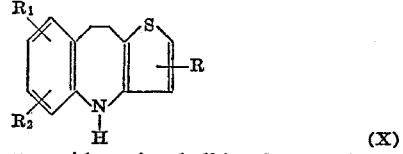

(X)

and reacting the latter with amino halide of Formula VI in the presence of a basic agent to obtain the corresponding benzazepine of Formula VIII which can be salified by addition of a mineral or organic acid or dealkylated by reaction with lower alkyl haloformate and then alkaline hydrolysis.

The acid hydrolysis agent is preferably an aqueous organic or inorganic acid, a ketonic acid or an aldehydic acid and the strong reducing agent is an alkali metal mixed hydride such as or alkali metal aluminum hydride in the presence of aluminum halide. The reducing agent may also be hydrogen in the presence of a platinum group metal catalyst or a metal such as zinc in the presence of a mineral acid or hydrazine in a basic media. The alkylaminoalkyl halide may be the chloride or bromide and the basic agent is preferably an alkali metal hydride.

Another process of the invention for the preparation of a compound of Formula VIII comprises reacting a 10-oxo-compound of Formula IV with a strong reducing agent to form the corresponding compound of Formula VIII which can then be salified or dealkylated. The strong reducing agent may be an alkali metal aluminum hydride in the presence of an aluminum salt or hydrogen in the presence of a platinum group metal catalyst or hydrazine in a basic medium or a metal such as zinc in a mineral acid.

Another process for the preparation of a thienobenzazepines of Formula II comprises reacting a 10-oxo-compound of Formula IX with a reducing agent to obtain a 9,10-dihydro compound of the formula

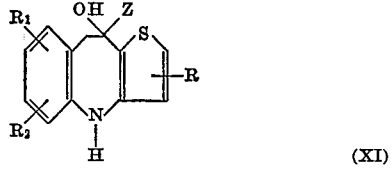

(XI)

wherein Z is hydrogen, dehydrating the latter by heating in the presence of a metallic oxide to form a compound of the formula

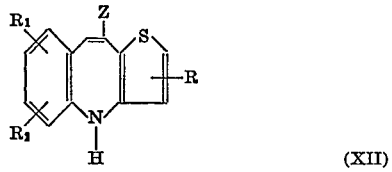

(XII)

and alkylating the latter by reaction with an amino alkyl halide of Formula VI in the presence of a basic agent to obtain the corresponding compound of Formula II.

In the preferred mode of the said process, the reducing agent is an alkali metal borohydride such as sodium, potassium, or lithium borohydride and the dehydration is effected by refluxing in a monocyclic aromatic hydrocarbon such as benzene, toluene, xylene or cymene in the presence of a metallic oxide such alumina.

The compounds of Formula I wherein Z and/or Z' are lower alkyl may be prepared by reacting a 10-oxo compound of Formula IV with an alkylating agent in the presence of a basic agent to obtain a compound of Formula I wherein Z' is lower alkyl and Z and Y form =O which can be reduced to obtain the corresponding 10-hydroxy compound which can be dehydrated to obtain a compound of Formula I wherein Z' is lower alkyl and X and Y form a double bond and Z is hydrogen which may be subjected to hydrogenolysis to form the corresponding 9,10 - dihydro-[4H]-thieno-[3,2-b][f]-benzazepine.

The 10-oxo-compounds of Formula IV may also be reacted with an organometallic reactant to form the corresponding 10-lower alkyl carbinol which may be dehydrated to form the corresponding [4H]-thieno-[3,2-b][f]-benzazepine wherein Z is lower alkyl or subjected to hydrogenolysis to form the corresponding 9,10-dihydro-[4H]-thieno-[3,2-b][f]-benzazepine wherein Z is lower alkyl.

The 10-keto compound of Formula I wherein Z and Y are =O and Z' is lower alkyl may also be subjected to reaction with an organometallic agent to form the corresponding 10-hydroxy - 9,10 - dihydro-[4H]-thieno-[3,2-b][f]-benzazepine of Formula I wherein Z and Z' are lower alkyl, dehydrating the latter to form a thieno-[3,2-b][f]-benzazepine wherein Z and Z' are lower alkyl, or subjecting the 10-hydroxy compound to hydrogenolysis to form the corresponding 9,10-dihydrothieno-[3,2-b][f]-benzazepine wherein Z and Z' are lower alkyl.

The novel intermediates of the invention have the formula

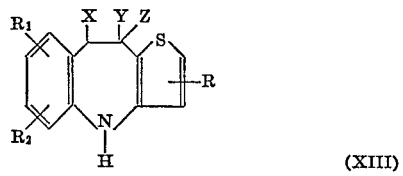

(XIII)

wherein R, $R_1$ and $R_2$ have the above definitions, X is hydrogen or together with Y forms a carbon-carbon double bond, Y is hydrogen or hydroxy and together with Z forms =O and Z is hydrogen.

The 9,10-dihydro-[4H]-thieno-[3,2-b][f]-benzazepines of Formula V may be prepared as described in copending, commonly assigned U.S. patent application Ser. No. 230,123, filed on even date herewith by reacting an o-nitrophenylacetic acid for the formula

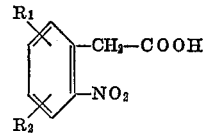

(A)

with a bromothiophene of the formula

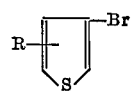

(B)

in the presence of a Lewis acid to form a thiophene of the formula

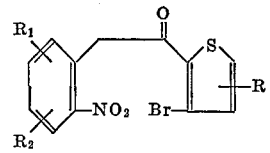

(C)

reacting the latter with a carbonyl blocking agent and reducing the resulting product to form a compound of the formula

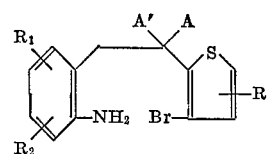

(D)

wherein A and A' are the carbonyl blocking group and cyclizing the latter in the presence of a cuprous salt.

The novel antidepressant compositions of the invention are comprised of an effective amount of at least one compound of Formula I or its non-toxic, pharmaceutically acceptable acid addition salts and a pharmaceutical carrier. The usual individual dose is 5 to 50 mg. in adults depending upon the specific compound and the therapeutic use. The compositions may be in the form of injectable solutions or suspensions in individual or multiple dose flacons or in the form of tablets, coated tablets, syrups, capsules, emulsions or suppositories.

The compositions of the invention are clearly differentiated from N-alkyl-dihydrodibenzazepines such as imipramine, trimeprimine, desipramine or opipramol by a substantially elevated antidepressant activity with a substantially lower acute toxicity determined intraperitoneally. The average lethal dose for imipramine, for example, is 80 mg./kg. with mice while that for the compounds of the invention is 150–300 mg./kg. for mice. This means that the compounds of the invention have a greater therapeutic index and are safer for prolonged administration. The compounds have been found to be active at doses in which the side effects of classic antidepressants are not exhibited.

The novel method of the invention for treating or preventing depression in warm-blooded animals comprises administering to warm-blooded animals an effective antidepressant amount of at least one compound of Formula I or its nontoxic, pharmaceutically acceptable acid addition salts. The compounds may be administered orally, reactally or parentally. The usual effective daily dose is 0, 2 to 6 mg./kg.

In the following examples there are described several preferred embodiments to illustrate the invention. However, it should be understood that the invention is to be limited only as defined in the appended claims.

EXAMPLE I

Fumarate of 10-oxo-4-(γ-dimethylaminopropyl)-9,10-dihydro-[4H]thieno[3,2-b][f]-benzazepine 6.5 g. of 10,10-ethylenedioxy-9,10-dihydro[4H]thieno-[3,2-b][f]benzazepine were dissolved with agitation in 250 ml. of xylene and then 1.25 g. of 50% sodium hydride in vaseline oil was added. The mixture was refluxed for 25 minutes and after cooling, 12.5 ml. of α-dimethylaminopropyl chloride were added. The mixture was refluxed for 6 hours and after cooling, the reaction mixture was added to ice. The mixture was decanted and the aqueous phase was extracted with ethyl acetate. The organic phases containing the intermediate, 10,10-ethylenedioxy-4-(γ-dimethylaminopropyl) - 9,10 - dihydro-[4H]-thieno[3,2-b]-[f]-benzazepine was washed with water and then was extracted with 2 N hydrochloric acid. The amine fraction was made alkaline by the addition of sodium hydroxide and was reextracted with ethyl acetate. The organic phase was washed with water, dried over magnesium sulfate and distilled to dryness under reduced pressure. The residue was chromatographed over silica gel and eluted with a 60-30-10 chloroform-acetone-triethylamine mixture. The eluant was evaporated to obtain 4.72 g. of 10-oxo-4-(γ-dimethylaminopropyl) - 9,10 - dihydro-[4H]thieno[3,2-b][f]-benzazepine.

2 g. of the said product were dissolved in 10 ml. of methanol and after the addition of a solution of 770 mg. of fumaric acid in methanol, the methanol was distilled off while being replaced with ethyl acetate until turbid. After crystallization started, the mixture was iced for 30 minutes and vacuum filtered and the recovered precipitate was washed with ethyl acetate and dried in vacuo to obtain 2.24 g. of the fumarate of 10-oxo-4-(γ-dimethylaminopropyl) - 9,19 - dihydrol[4H]thieno[3,2-b]-[f]-benzazepine melting at 198° C. The product occurred in the form of pale yellow crystals soluble in water, methanol and ethanol and slightly soluble in chlorinated organic solvents. For analysis, the product was crystallized from isopropanol and the melting point did not change.

*Analysis.*—$C_{21}H_{24}O_5N_2S$; molecular weight=416.50. Calculated percent): C, 60.56; H, 5.81; N, 6.72; S, 7.70. Found (percent): C, 60.4; H, 5.7; N, 6.6; S, 7.4.

U.V. spectrum (ethanol):

Max. at 247 nm.

$$E^{1\%}_{1cm.}=269, \epsilon=11,200$$

Max. at 275 nm.

$$E^{1\%}_{1cm.}=188, \epsilon=7,850$$

Inflex. towards 326 nm.

$$E^{1\%}_{1cm.}=105$$

Inflex. towards 353 nm.

$$E^{1\%}_{1cm.}=210$$

Max. at 358 nm.

$$E^{1\%}_{1cm.}=216, \epsilon=9,000$$

The 10,10-ethylenedioxy-4-(γ-dimethylaminopropyl)-9,10-dihydro-[4H]-thieno[3,2-b[[f]-benzazepine contained in the organic phase was recovered by drying over magnesium sulfate and evaporation to dryness.

The said base was reacted with fumaric acid to obtain the corresponding fumarate in the form of a yellow solid melting at 180° C. and soluble in methanol and water and slightly soluble in ethanol and chloroform.

EXAMPLE II 10-hydroxy-4-(γ-dimethylaminopropyl)-9,10-dihydro-[4H]-thieno-[3,2-b][f]-benzazepine 500 mg. of lithium aluminum hydride were added to a mixture of 5 g. of 10-oxo-4-(α-dimethylaminopropyl)-9,10 - dihydro - [4H]-thieno-[3,2-b][f]-benzazepine in 200 ml. of tetrahydrofuran and the mixture was stirred at room temperature for 4 hours and then was cooled. The mixture was added to ethyl acetate and filtered and the filtrate was evaporated to dryness under reduced pressure. The residue was chromatographed over silica gel and eluted with a 6-3-1 chloroform-acetone-triethylamine mixture and the eluant was evaporated to obtain 4.12 g. of 10 - hydroxy - 4 - (γ-dimethylaminopropyl)-9,10-dihydro-[4H]-thieno[3,2-b][f]-benzazepine in the form of a yellow amorphous product soluble in alcohols and chlorinated organic solvents and insoluble in water.

IR spectrum (chloroform): Presence of OH at $3570^{cm.-1}$, of aromatic and N<

U.V. spectrum (ethanol):

Inflex. towards 234 nm.

$$E^{1\%}_{1cm.}=214$$

Max. at 262–263 nm.

$$E^{1\%}_{1cm.}=172, \epsilon=5,200$$

Max. at 295 nm.

$$E^{1\%}_{1cm.}=156, \epsilon=4,700$$

Max. at 358 nm.

$$E^{1\%}_{1cm.}=1$$

The said product can be salified with fumaric acid to form the acid fumarate thereof.

EXAMPLE III 4-(γ-dimethylaminopropyl)-[4H]-thieno-[3,2-b][f]-benzazepine and its acid fumarate 7 ml. of concentrated hydrochloric acid were added with agitation to a solution of 3.5 g. of 10-hydroxy-4-[γ-dimethylaminopropyl)-9,10-dihydro-[4H] - thieno - [3,2-b]-benzazepine in 70 ml. of acetone and the mixture was stirred at room temperature for 30 minutes and was then poured over ice. The mixture was made alkaline by addition of ammonium hydroxide and was extracted with ethyl acetate. The organic phase was washed with water, dried over magnesium sulfate and distilled to dryness under reduced pressure. The residue was dissolved in 30 ml. of ether and the solution was filtered and evaporated to dryness under reduced pressure to obtain 2.95 g. of 4-(γ-dimethylaminopropyl)-[4H]-thieno - [3,2 - b] [f]-benzazepine.

2.95 g. of the said base were dissolved in 10 ml. of methanol and then a solution of 1.15 g. of fumaric acid in methanol was added. The mixture was filtered and the methanol was distilled while being replaced with ethyl acetate to the point of turbidity. Crystallization was started and the mixture was iced for 30 minutes and then vacuum filtered. The precipitate was washed with ethyl acetate and dried in vacuo. The residue was dissolved in 20 volumes of refluxing isopropanol, and the solution was filtered and concentrated to half its volume. Crystallization was started and the mixture was iced for one hour and then vacuum filtered. The precipitate was washed and dried in vacuo to obtain 3.2 g. of acid fumarate of 4 - (γ-dimethylaminopropyl)-[4H] - thieno - [3,2 - b][f] - benzazepine melting at 166° C. The product occurred in the form of yellow crystals soluble in methanol and ethanol and slightly soluble in water.

*Analysis.*—$C_{21}H_{24}O_4N_2S$; molecular weight=400.50. Calculated (percent): C, 62.98; H, 6.04; N, 6.99; S, 8.01. Found (percent): C, 62.9; H, 6.1; N, 7.2; S, 8.0.

U.V. spectrum (ethanol):

Max at 211 nm., $\epsilon=30,150$
Max. at 263 nm., $\epsilon=18,800$
Max. at 363 nm., $\epsilon=1,480$

EXAMPLE IV 4-(γ-dimethylaminopropyl)-9,10-dihydro-[4H]-thieno-[3,2-b][f]-benzazepine 4 g. of lithium aluminum hydride were added with stirring in portions to a cooled suspension of 4 g. of 10- oxo-4-(γ-dimethylaminopropyl) - 9,10 - dihydro - [4H]-thieno-[3,2-b][f]-benzazepine in 160 ml. of tetrahydrofuran while keeping the temperature below 0° C. and after 4 g. of aluminum chloride were added, the mixture was stirred for 2 hours at 0° C. Excess lithium aluminum hydride was destroyed by the addition of isopropanol and 2 N sodium hydroxide was added to the mixture which was filtered. The filter was rinsed with water, then methylene chloride and the mixture was decanted. The aqueous phase was extracted with methylene chloride and the organic phases were washed with water, dried over magnesium sulfate and distilled to dryness under reduced pressure to obtain 3.48 of product which was combined with the product from a preceding test beginning with 2 g. of the 10-oxo compound. The mixture was chromatographed over silica gel and eluted with a chloroform-acetone-triethylamine (60–30–10) mixture. Evaporation of the eluant gave 1.62 g. of residue which was combined with a chromatographed product from a preceding test beginning with 2 g. of the 10-oxo compound. The product was purified by chromatography over silica gel and evaporation of the eluant gives 2.1 g. of 4-(γ-dimethylaminopropyl)-9,10-dihydro-[4H]-thieno-[3,2-b][f] - benzazepine in the form of a chestnut liquid soluble in alcohols, ethers and methylene chloride and insoluble in water.

U.V. spectrum (ethanol):

Inflex. towards 232 nm.

$$E_{1cm.}^{1\%}=282$$

Max. at 268 nm.

$$E_{1cm.}^{1\%}=203, \epsilon=5,800$$

Max. at 295 nm.

$$E_{1cm.}^{1\%}=159, \epsilon=4,550$$

Inflex. towards 358 nm.

$$E_{1cm.}^{1\%}=2$$

EXAMPLE V 4-(γ-dimethylaminopropyl)-9,10-dihydro-[4H]-thieno-[3,2-b][f]-benzazepine Step A: 10-oxo-9,10-dihydro-[4H]-thieno - [3,2-b][f]-benzazepine.—20 ml. of concentrated hydrochloric acid were added to a mixture of 20 g. of 10,10-ethylenedioxy-9,10-dihydro-[4H]-thieno-[3,2 - b][f] - benzazepine and 200 ml. of ethanol and the mixture was stirred for 1 hour at room temperature. The mixture was concentrated under reduced pressure to 100 ml. and the solution was then poured into a water-ice mixture and was extracted with methylene chloride. The organic phase was washed with water, dried over magnesium sulfate, treated with activated carbon, filtered and distilled to dryness under reduced pressure. The residue was dissolved in 100 ml. of refluxing ethanol, and the solution was filtered and concentrated to 60 ml. and filtered. The recovered precipitate was washed with ethanol and dried in vacuo at 70° C. to obtain 7.75 g. of 10-oxo-9,10 - dihydro - [4H] - thieno-[3,2 - b][f] - benzazepine. Concentration of the mother liquors gave a second crop of 5.35 g. for a total yield of 13.10 g. (79%) of the said product. The product occurred in the form of yellow crystals melting at 195° C. and soluble in chlorinated organic solvents and alcohols, slightly soluble in ether and benzene and insoluble in water.

Analysis.—$C_{12}H_9ONS$; molecular weight=215.28. Calculated (percent): C, 66.95; H, 4.21. N, 6.51; S, 14.90. Found (percent): C, 67.2; H, 4.4; N, 6.3; C, 14.6.

IR spectrum (chloroform): Presence of NH at $3402^{cm.-1}$, complex carbonyl at 1643 and $1636^{cm.-1}$ with a shoulder at $1611^{cm.-1}$ with the carbonyl band.

U.V. spectrum (ethanol):

Max. at 245 nm.

$$E_{1cm.}^{1\%}=872, \epsilon=18,750$$

Max. at 275 nm.

$$E_{1cm.}^{1\%}=330, \epsilon=7,100$$

Inflex. towards 322 nm.

$$E_{1cm.}^{1\%}=133$$

Max. at 360 nm.

$$E_{1cm.}^{1\%}=422, \epsilon=9,000$$

Step B: [4H]-9,10-dihydro-thieno-[3,2-b][f]-benzazepine.—7 g. of 10-oxo-9,10-dihydro-[4H]-thieno-[3,2-b][f]-benzazepine where dissolved with stirring in 280 ml. of tetrahydrofuran at temperatures below 0° C. and then 7 g. of lithium aluminum hydride and then 7 g. of aluminum chloride were added thereto. The mixture was stirred at 0° C. for 1 hour and was then stirred at room temperature for 2 hours. After cooling to 0° C., another 7 g. of lithium aluminum hydride and then 7 g. of aluminum chloride were added thereto. The mixture returned to room temperature, was stirred for 2 hours and then was cooled. Excess lithium aluminum hydride was destroyed by addition of isopropanol while keeping the temperature between 0 and 10° C. and the precipitate formed was dissolved by addition of 2 N sodium hydroxide. The mixture was filtered and the filtrate was extracted with methylene chloride. The organic phases were washed with an aqueous sodium chloride solution, dried over magnesium sulfate and distilled to dryness under reduced pressure to obtain 7 g. of product. The residue was subjected to chromatography over silica gel and eluted with a 60–30–10 mixture of cyclohexane-chloroform-triethylamine. The solution was distilled to dryness and the residue was dissolved in 10 volumes of ether. The solution was filtered, treated with carbon black and concentrated by heating to the point of crystallization. 10 volumes of pentane were added and the mixture was vacuum filtered. The precipitate was washed with pentane and dried under reduced pressure to obtain 9,10-dihydro-[4H]-thieno-[3,2-b][f]-benzazepine melting at 114° C. For analysis, the product was crystallized from isopropyl ether without change of the melting point. The product occurred in the form of beige crystals soluble in chlorinated organic solvents, alcohols, bezene and ether and insoluble in water.

Analysis.—$C_{12}H_{11}NS$; molecular weight=201.29. Calculated (percent): C, 71.61; H, 5.51; N, 6.96; S, 15.93. Found (percent): C, 71.4; H, 5.6; N, 7.0; S, 15.5.

IR spectrum (chloroform): Presence of NH at $3416^{cm.-1}$ and of aromatic and absence of carbonyl U.V. spectrum (ethanol):

Max. at 229–230 nm., $\epsilon=12,800$
Max. at 265 nm., $\epsilon=8,060$
Max. at 304 nm., $\epsilon=8,200$ Step C: 4 - (γ-dimethylaminopropyl) - 9,10-dihydro-[4H]-thieno-[3,2-b][f]-benzazepine.—4 g. of 9,10-dihydro - [4H]-thieno-[3,2-b][f]-benzazepine were dissolved with stirring in 80 ml. of xylene and after the addition of 1.15 g. of 50% sodium hydride in vaseline oil, the mixture was refluxed for 30 minutes and then cooled to 50° C. 8 ml. of γ-dimethylaminopropyl chloride were added and the mixture was refluxed for 5 hours and then cooled. The mixture was poured over ice-water and was then extracted with ether. The ether phase was washed with water and then was extracted with 2 N hydrochloric acid. The acid extract was made alkaline by the addition of sodium hydroxide and the aqueous phase was extracted with ether. The ether phase was washed with water, dried over magnesium sulfate and distilled to dryness under reduced pressure to obtain 5.7 g. of 4-(γ-dimethylaminopropyl) - 9,10 - dihydro-[4H]-thieno-[3,2-b][f]-benzazepine identical to the product of Example IV.

EXAMPLE VI

Hydrochloride of 4-(γ-methylaminopropyl)-9,10-dihydro-[4H]-thieno-[3,2-b][f]-benzazepine

5.7 g. of 4 - (γ-dimethylaminopropyl)-9,10-dihydro-[4H]-thieno-[3,2-b][f]-benzazepine were dissolved with stirring in 57 ml. of benzene and after the addition of 8.5 ml. of ethyl chloroformate, the mixture was refluxed for 5 hours. After cooling, the mixture was poured over ice and was extracted with ethyl acetate. The organic phase was washed with 2 N hydrochloric acid, then with water, dried over magnesium sulfate and distilled to dryness under reduced pressure to obtain 6.73 g. of 4-(γ-N-methyl-N-ethoxycarbonylaminopropyl) - 9,10 - dihydro-[4H]-thieno-[3,2-b][f]-benzazepine.

The latter product was dissolved with stirring in 67 ml. of n-butanol and after the addition of 6.73 g. of potassium hydroxide pellets, the mixture was refluxed for 20 hours. Water was then added thereto and the mixture was extracted with ether. The organic phase was extracted with 2 N hydrochloric acid and the acid aqueous phase was made alkaline by addition of sodium hydroxide. The aqueous phase was extacted with ether and the ether phase was washed with water, dried over magnesium sulfate and distilled to dryness under reduced pressure to obtain 4.25 g. (79% yield) of 4-(γ-methylaminopropyl)-9,10-dihydro - [4H]-thieno-[3,2-b][f]-benzazepine.

4.25 g. of the latter product were dissolved in 30 ml. of isopropanol and a saturated solution of hydrochloric acid in ethyl acetate was added until the pH was just acid. The ethyl acetate was distilled off and the mixture was filtered. The filtrate was concentrated to 20 ml. and crystallization was induced. After standing for 30 minutes, the mixture was vacuum filtered and the precipitate was washed with isopropanol and dried in vacuo to obtain 3.95 g. of the hydrochloride of 4-(γ-methylaminopropyl)-9,10-dihydro-[4H]-thieno-[3,2-b][f]-benzazepine melting at 217° C.

For analysis, the product was crystallized from isopropanol without changing the melting point. The product occurred in the form of beige crystals soluble in water, ethanol, methanol and chloroform.

*Analysis.*—$C_{16}H_{21}N_2SCl$; molecular weight=308.88. Calculated (percent): C, 62.22; H, 6.85; N, 9.07; S, 10.38; Cl, 11.48. Found (percent): C, 61.9; H, 6.8; N, 8.9; S, 10.2; Cl, 11.7.

U.V. spectrum (ethanol):

Inflex. towards 231 nm.

$$E_{1\,cm.}^{1\%}=264$$

Max. at 266 nm.

$$E_{1\,cm.}^{1\%}=188,\ \epsilon=5,800$$

Max. at 291 nm.

$$E_{1\,cm.}^{1\%}=144,\ \epsilon=4,450$$

IR spectrum (chloroform): Presence of aromatic and strong absorption between 3,625 and 3,875 cm.$^{-1}$ and between 2,367 and 2,500 cm.$^{-1}$.

RMN Spectrum ($CDCl_3$):

aromatic protons of thiophene ring—407.5–413–415.5 and 421 Hz.

aromatic protons of benzene ring 420 to 440 Hz.

protons of dihydroazepine ring at 184 Hz.

alkylene chain:

α—224–231–237 Hz.
β—117–125–132–139 Hz.
γ—167–175–184 Hz.

methyl of nitrogen at 147 Hz.

EXAMPLE VII

Hydrochloride of 4-(γ-dimethylamino-β-methylpropyl)-9,10-dihydro-[4H]-thieno-[3,2-b][f]-benzazepine

3.5 g. of 9,10-dihydro-[4H]-thieno-[3,2-b][f]benzazepine were dissolved with stirring in 70 ml. of xylene and after the addition of 1 g. of 50% sodium hydride suspension in vaseline oil, the mixture was refluxed for 30 minutes and then was slightly cooled. 7 ml. of 1-dimethylamino-2-methyl-3-chloropropane [Bourquin, Helv, vol. 41 (1958), p. 1072] were added thereto and the mixture was refluxed for 2 hours and then cooled. The mixture was poured into a water-ice mixture and was then extracted with ether. The ether phase was washed with water and extracted with 2 N hydrochloric acid. The acid aqueous phase was made alkaline by the addition of sodium hydroxide and was reextracted with ethyl acetate. The organic phase was washed with water, dried over magnesium sulfate, treated with activated carbon, filtered and distilled to dryness in vacuo to obtain 5.5 g. of 4-(γ-dimethylamino - β - methylpropyl) - 9,10 - dihydro-[4H]-thieno-[3,2-b][f]-benzazepine.

The 5.5 g. of said product were dissoved in 50 ml. of ethyl acetate and then a solution of hydrochloric acid in ethyl acetate was added slowly until the pH was 4. The mixture was heated to reflux and crystallization was induced. After standing for 30 minutes, the mixture was vacuum filtered and the precipitate was washed with ethyl acetate and dried in vacuo at 70° C. After crystallization from isopropanol, there were obtained 4.95 g. of hydrochloride of 4-(γ-dimethylamino-δ-methyl-propyl)-9,10-dihydro - [4H] - thieno-[3,2-b][f]-benzazepine melting at 210° C. The product occurred in the beige crystals soluble in water, chloroform and ethanol.

*Analysis.* — $C_{18}H_{25}N_2SCl$; molecular weight=336.94. Calculated (percent): C, 64.17; H, 7.48; N, 8.31; S, 9.52; Cl, 10.52. Found (percent): C, 64.0; H, 7.5; N, 8.2; S, 9.3; Cl, 10.8.

U.V. spectrum (ethanol):

Inflex. towards 235 nm.

$$E_{1\,cm.}^{1\%}=230$$

Max. at 267 nm.

$$E_{1\,cm.}^{1\%}=171,\ \epsilon=5,750$$

Max. at 293 nm.

$$E_{1\,cm.}^{1\%}=131,\ \epsilon=4,400$$

The starting 1 - dimethylamino-2-methyl-3-chloropropane was prepared by dissolved 50 g. of the hydrochloride of 1-dimehtylamino-2-methyl-3-chloropropane in 50 ml. of water cooled in an ice bath, adding 50 ml. of sodium hydroxide, extracting the latter with ether, washing the ether phase with water, drying over magnesium sulfate, evaporating the ether and rectifying the residue under reduced pressure to obtain 27 g. of the said product in the form of a liquid boiling at 43–44° C. at 20 mm. Hg.

EXAMPLE VIII

4-(γ-dimethylaminopropyl)-[4H]-thieno-[3,2-b][f]-benzazepine

Step A: 10-hydroxy-9,10-dihydro-[4H]-thieno-[3,2-b][f]-benzazepine.—40 g. of sodium borohydride were added with stirring to a solution of 40 g. of 10-oxo-9,10-dihydro-[4H]-thieno-[3,2-b][f]-benzazepine in 800 ml. of dioxane and 80 ml. of water and the mixture was heated at 50° C. with stirring for 2 hours. The mixture was cooled to 20° C. and then another 20 g. of sodium borohydride were added followed by heating with stirring at 50° C. for 2 hours. Again, 20 g. of sodium borohydride were added thereto and the mixture was stirred for 3 hours at 50° C. and then 16 hours at room temperature. The mixture was poured into an ice-water mixture and was then extracted with ethyl acetate. The organic phase was washed with water, dried over magnesium sulfate and distilled to dryness under reduced pressure to obtain 40 g. of 10 - hydroxy-9,10-dihydro-[4H]-thieno-[3,2-b][f]-benzazepine which was used as is for the next step.

Step B: [4H]-thieno-[3,2-b][f]-benzazepine.—40 g. of alumina were added with stirring to a solution of 40 g. of the product from Step A in 600 ml. of benzene and the mixture was refluxed for 16 hours and then was cooled. The mixture was vacuum filtered and the filter was rinsed with methylene chloride. The filtrate was distilled to dryness in vacuo to obtain 32.6 g. of [4H]-thieno-[3,2-b][f]-benzazepine which was used as is for the next step.

For analysis, the product was purified by crystallization from isopropyl ether to obtain the product in the form of red crystals melting at 187° C. with decomposition and soluble in chlorinated organic solvents, alcohols and ether and insoluble in wtaer.

Analysis.—$C_{12}H_9NS$; molecular weight=199.28. Calculated (percent): C, 72.35; H, 4.55; N, 7.03; S, 16.06. Found (percent): C, 71.9–71.9; H, 4.9–4.6; N, 7.5–7.0; S, 15.9.

IR spectrum (chloroform): Presence of NH at 3401 cm.$^{-1}$, of aromatic and of conjugated C=C.
U.V. spectrum ethanol:

Max. at 238 nm.

$$E_{1cm.}^{1\%}=681, \epsilon=13,600$$

Max. at 270 nm.

$$E_{1cm.}^{1\%}=1,100, \epsilon=22,000$$

Inflex. towards 284 nm.

$$E_{1cm.}^{1\%}=737$$

Inflex towards 304 nm.

$$E_{1cm.}^{1\%}=238$$

Inflex. towards 390 nm.

$$E_{1cm.}^{1\%}=36$$

Step C: 4-(γ-dimethylaminopropyl)][4H]-thieno-[3,2-b][f]-benzazepine.—3.6 g. of 50% sodium hydride suspended in vaseline oil were added to a solution of 6 g. of [4H]-thieno-[3,2-b][f]-benzazepine in 120 ml. of refluxing xylene and the mixture was refluxed with stirring for one hour. 12 ml. of γ-dimethylaminopropyl chloride were added thereto and the mixture was refluxed for 2 hours. After cooling, the mixture was poured in an ice-water mixture and was extracted with ether. The organic phase was washed with water and was then extracted with 2 N hydrochloric acid. The separated aqueous solution was made alkaline with sodium hydroxide and was then extracted with ether. The ether phase was washed with water, dried over magnesium sulfate and distilled to dryness under reduced pressure. The residue was redissolved in ether and the solution was passed through a column silicate. The obtained ether phase was distilled to dryness under reduced pressure to obtain 4.73 g. of 4-(γ-dimethylaminopropyl)-[4H]-thieno - [3,2 - b][f] - benzazepine which was reacted with fumaric acid to form its fumarate. The product was identical to that of Example III.

EXAMPLE IX

Hydrochloride of 4-(β-methylaminoethyl)-9,10-dihydro-[4H]-thieno-[3,2-b][f]-benzazepine Using the procedure of Example V, 9,10-dihydro-[4H]-thieno-[3,2-b][f]-benzazepine was reacted with β-dimethylaminoethyl chloride to form 4-(β-dimethylaminoethyl)-9,10-dihydro-[4H]-thieno-[3,2-b][f]-benzazepine which was reacted by the procedure of Example VI with ethyl chloroformate to form 4-(β-N-methyl-N-ethoxycarbonylaminoethyl) - 9,10-dihydro-[4H]-thieno-[3,2-b][f]-benzazepine which was reacted with 2 N potassium hydroxide to form 4-(β-methylaminoethyl)-9,10-dihydro-[4H]-thieno-[3,2-b][f]-benzazepine. The latter was reacted with hydrochloric acid in ethyl acetate to form the corresponding hydrochloride in the form of a cream solid melting at 248° C. and soluble in methanol and water, slightly soluble in isopropanol and insoluble in ether and ethyl acetate.

EXAMPLE X

Maleate of 4-(γ-methylaminopropyl)-[4H]-thieno-[3,2-b][f]-benzazepine

Using the procedure of Step C of Example VIII, [4H]-thieno-[3,2-b][f]-benzazepine was reacted with γ-methylaminopropyl chloride to obtain 4-(γ-methylaminopropyl)-[4H]-thieno-[3,2-b][f]-benzazepine which was reacted with maleic acid to form the corresponding maleate in the form of a yellow solid melting at 115° C. and soluble in methanol, ethanol, chloroform and water and slightly soluble in ethyl acetate.

EXAMPLE XI

Hydrochloride of 4-(β-dimethylaminoethyl)-9,10-dihydro-[4H]-thieno-[3,2-b][f]-benzazepine 4 - (β-dimethylaminoethyl)-9,10-dihydro-[4H]-thieno-[3,2-b][f]-benzazepine of Example IX was reacted with hydrochloric acid in methanol to obtain the corresponding hydrochloride melting at 218° C. and occurring in the form of cream solid soluble in methanol and water, slightly soluble in ethyl acetate and isopropanol and insoluble in chloroform.

PHARMACOLOGICAL STUDY (A) Antidepressive activity

The antidepressive activity was determined by antagonism exerted by the compounds against the depressant effect of reserpine which effect is measured by the test of ptosis of the eyelid codified by Rubin [J. Pharm. Exp. Ther., vol. 120 (1957), p. 125]. The said test is used to permit a quantitative evaluation of the state of the animal but the antagonism is exercised also with all neurodepressive symptoms of reserpine: immobility, adynamia, myosis and hypothermia.

The readings were taken every hour for 6 hours after the intraperitoneal injection of 1 mg./kg. of the reserpine to groups of rats who had received intraperitoneally one hour before varying doses of the test products. The ptosis provoked by injection of reserpine was diminished by the previous injection of the test compounds so much more the higher the dose. The results are expressed as a percentage of protection as compared with controls not having received reserpine. The results are reported in Table I.

TABLE I

| Test product | Percent of protection after dose of— | | | | |
| --- | --- | --- | --- | --- | --- |
| | 1 mg./kg. | 2 mg./kg. | 5 mg./kg. | 10 mg./kg. | 20 mg./kg. |
| Fumarate of 4-(γ-dimethylaminopropyl)[4H]-thieno-[3,2-b] [f]-benzazepine (A) | 20 | 49 | 55 | 83 | 93 |
| 4-(γ-dimethylaminopropyl)-9,10-dihydro-[4H]-thieno-[3,2-b] [f]-benzazepine (B) | 0 | 0 | 69 | 84 | 87 |
| Hydrochloride of 4-(γ-methylaminopropyl)-9,10-dihydro-[4H]-thieno-[3,2-b] [f]-benzazepine (C) | 7 | 26 | 32 | 52 | 67 |

From these results, the dose that reduced 50% of ptosis of the eyelid provoked by reserpine, $DA_{50}$, was 2 mg./kg. of Compound A, 4 mg./kg. for Compound B and 10 mg./kg. for Compound C.

(B) Potentialization of DOPA

The administration of DOPA [racemic β-(3,4-dihydroxyphenyl)alanine] to mice pretreated with 1-isonicotinoyl-2-isopropylhydrazine 18 hours before the test produced a certain number of symptoms: hypertonicity, agitation, crying, aggressiveness, salivation, exophthalmia. The administration of an antidepressant one hour before the injection of DOPA potentialized the intensity of the effects.

Male mice weighing between 18 and 22 gm. received 50 mg./kg. of 1-isonicotinoyl-2-isopropyl-hydrazine intraperitoneally 18 hours before the test and then received an intraperitoneal injection of the test product in aqueous solution in increasing doses. One hour later, they received an intraperitoneal injection of 50 mg./kg. of DOPA and then the different effects were evaluated 15 and 30 minutes after the DOPA injection. Each symptom was evaluated from 0 to 3 for each animal and the different notations were totaled for each dose. The totals obtained are reported in Table II as a percentage of the total obtained by control animals.

TABLE II

| Test compound | Dose administered in mg./kg. | | | |
|---|---|---|---|---|
| | 2 | 5 | 10 | 20 |
| A | 173 | 184 | 188 | |
| B | | 247 | 273 | 269 |

The results of Table II show that the two products possess an important potentialization activity for DOPA.

(C) Anti-tetrabenazine test

Tetrabenazine produces a depressant effect characterized by eyelid ptosis and a certain catatonic state. The previous administration of an antidepressant antagonizes, hinders, retards or diminishes the symptoms. Group of female rats weighing 100 to 110 g. received intraperitoneally at different doses the test products in an aqueous hydrochloric acid solution at a pH of 3 and one hour later received intraperitoneally 10 mg./kg. of tetrabenazine. The animals were tested ½, 1, 1½ and 2 hours after the injection of tetrabenazine. Each animal was evaluated for passive ptosis of the eyelid and the catatonic state, and the totalized values obtained for each group of rats in the course of 4 tests are noted. The results expressed as a percentage of protection are reported in Table III.

TABLE III

| Test compound | Dose in mg./kg. | Percent of protection | |
|---|---|---|---|
| | | Ptosis | Catatonic |
| A | 1 | 0 | 0 |
| | 2 | 25 | 28 |
| | 5 | 70 | 55 |
| | 10 | 51 | 73 |
| | 20 | 92 | 73 |
| | 50 | 99 | 79 |
| B | 1 | 13 | 0 |
| | 2 | 16 | 18 |
| | 5 | 50 | 0 |
| | 10 | 99 | 11 |
| | 20 | 100 | 35 |
| C | 1 | 42 | 18 |
| | 2 | 85 | 13 |
| | 5 | 98 | 15 |
| | 10 | 100 | 30 |
| | 20 | 100 | 30 |
| | 50 | 95 | 78 |

The results show that the $DA_{50}$ for compound A was 3–4 mg./kg. for ptosis and 5 mg./kg. for catatonic state, for compound B was 5 mg./kg. for ptosis and more than 20 mg./kg. for catatonic state and for Compound C was 1.5 mg./kg. for ptosis and 35 mg./kg. for catatonic state.

(D) Potentialization of sleeping time

The potentialization of sleeping time was determined with a test with amytal (5-ethyl-5-isoamyl-barbituric acid). Groups of female mice weighing between 18–22 g. were maintained at 25° C. for the duration of the test. The product studied was administered intraperitoneally at different doses 1 hour before the intravenous injection of 80 mg./kg. of amytal. The sleeping time during which the reflex of righting of the mouse is negative was noted. The test compounds in aqueous solution of hydrochloric acid of a pH of 3 were administered at the doses of Table IV. For each group, the average sleeping time is expressed in minutes.

TABLE IV

| Group | Dose in mg./kg. | Average sleeping time |
|---|---|---|
| Controls | 0 | 21.8 |
| A | 2 | 40.3 |
| | 5 | 40.3 |
| | 10 | 39.0 |
| | 20 | 37.3 |
| Controls | 0 | 32.9 |
| B | 2 | 34.5 |
| | 5 | 34.3 |
| | 10 | 45.7 |
| | 20 | 53.8 |

The results of Table IV show that the two products potentialize the sleeping time provoked by amytal.

(E) Acute toxicity determination

The acute toxicity was determined on mice of the Swiss strain weighing about 20 g. to which the test product was administered intraperitoneally in increasing doses. The animals were then observed for one week. The $DL_{50}$ dose was 150 mg./kg. for Compound A, 180 mg./kg. for Compound B, 150 mg./kg. for Compound C and 300 mg./kg. for the fumarate of 10-oxo-4-(γ-dimethylaminopropyl)-9,10-dihydro-[4H]-thieno-[3,2-b] [f]-benzazepine.

Various modifications of the compositions and methods of the invention may be made without departing from the spirit or scope thereof and it is to be understood that the invention is to be limited only as defined in the appended claims.

We claim:

1. A compound selected from the group consisting of 4-(alkylaminoalkyl)-[4H]-thieno-[3,2-b] [f]-benzazepine of the formula

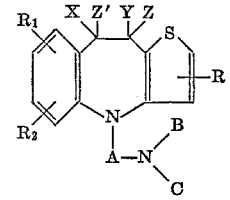

wherein $R_1$ and $R_2$ are selected from the group consisting of hydrogen, halogen, —$CF_3$, lower alkoxy, lower alkylthio, lower alkyl, sulfonamido and diloweralkylamino, R is selected from the group consisting of hydrogen and lower alkyl, A is alkylene of 2 to 5 carbon atoms optionally substituted by lower alkyl, B is selected from the group consisting of hydrogen and lower alkyl, C is lower alkyl, Y is selected from the group consisting of hydrogen, hydroxy, lower alkoxy and lower alkanoyloxy, X is hydrogen or taken together with Y forms a carbon-carbon double bond, Z' is selected from the group consisting of hydrogen and lower alkyl and Z is selected from the group consisting of hydrogen, lower alkyl and lower alkoxy or taken with Y forms a member of the group consisting of =O, lower alkylenedioxy, lower alkylenedithio and thio-loweralkyleneoxy and their non-toxic, pharmaceutically acceptable acid addition salts.

2. A compound of claim 1 selected from the group consisting of 4 - (γ-dimethylaminopropyl)-[4H]-thieno-[3,2-b][f]-benzazepine and its acid fumarate.

3. A compound of claim 1 selected from the group consisting of 4 - (γ-methylaminopropyl)-9,10-dihydro-[4H]-thieno-[3,2-b][f]-benzazepine and its hydrochloride.

4. A compound of claim 1 selected from the group consisting of 4 - (γ-dimethylaminopropyl)-9,10-dihydro-[4H]-thieno-[3,2-b][f]-benzazepine and its hydrochloride.

5. A compound of claim 1 selected from the group consisting of 4 - (γ-dimethylamino-β-methyl-propyl)-9,10-dihydro-[4H]-thieno-[3,2-b][f]-benzazepine and its hydrochloride.

6. A compound of claim 1 selected from the group consisting of 4 - (γ-dimethylaminopropyl)-10-hydroxy-9,10-dihydro-[4H]-thieno-[3,2-b][f]-benzazepine and its acid fumarate.

7. A compound of claim 1 selected from the group consisting of 4 - (γ-dimethylaminopropyl)-10-oxo-9,10-dihydro-[4H]-thieno-[3,2-b][f]-benzazepine and its acid fumarate.

8. A compound of claim 1 selected from the group consisting of 4 - (β-methylaminoethyl)-9,10-dihydro-[4H] thieno-[3,2-b][f]-benzazepine and its hydrochloride.

9. A compound of claim 1 selected from the group consisting of 4 - (β-dimethylaminoethyl)-9,10-dihydro-[4H] - thieno-[3,2-b][f] - benzazepine and its chlorohydride.

10. A compound of claim 1 selected from the group consisting of 4 - (γ - methylaminopropyl)-[4H]-thieno-[3,2-b][f]-benzazepine and its maleate.

11. A [4H]-thieno-[3,2-b][f]-benzazepine of the formula

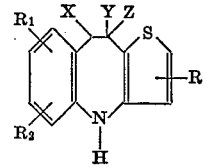

wherein $R_1$ and $R_2$ are selected from the group consisting of hydrogen, halogen, —$CF_3$, lower alkoxy, lower alkylthio, lower alkyl, sulfonamido and diloweralkylamino, R is selected from the group consisting of hydrogen and lower alkyl, X is hydrogen or taken together with Y forms a carbon-carbon double bond, Z is hydrogen or taken together with Y is =O and Y is selected from the group consisting of hydrogen and hydroxyl.

References Cited

UNITED STATES PATENTS

| | | | |
|---|---|---|---|
| 3,144,443 | 8/1964 | Schindler et al. | 260—239 |
| 3,185,679 | 5/1965 | Schindler et al. | 260—239 |
| 3,144,440 | 8/1964 | Schindler et al. | 260—239 |

OTHER REFERENCES

Morrison et al.: Organic Chemistry (Allyn and Bacon, Boston, 1959), pp. 634 to 636 and 629 to 630.

HENRY R. JILES, Primary Examiner

C. M. S. JAISLE, Assistant Examiner

U.S. Cl. X.R.

260—329 F, 329 HS, 329 S, 332.3 C, 332.3 P, 332.5; 424—275, 276, 277